United States Patent [19]

Sekiguchi et al.

[11] Patent Number: 5,252,190
[45] Date of Patent: Oct. 12, 1993

[54] METHOD FOR REMOVING A HARMFUL SUBSTANCE SELECTED FROM THE GROUP CONSISTING OF ETHYLENE, MERCAPTANS, AMINES, AND ALDEHYDES

[75] Inventors: Kenichi Sekiguchi, Hachioji; Tsunehisa Ueda, Zushi; Tadao Natsuume, Yokosuka, all of Japan

[73] Assignee: Nippon Zeon Co., Ltd., Tokyo, Japan

[21] Appl. No.: 663,024

[22] Filed: Mar. 1, 1991

[30] Foreign Application Priority Data

Mar. 1, 1990 [JP] Japan .................................. 2-50243
May 10, 1990 [JP] Japan ................................. 2-120414

[51] Int. Cl.$^5$ ............................................. B01D 53/00
[52] U.S. Cl. ............................ 204/157.3; 204/158.21; 422/5; 422/186.3; 502/120
[58] Field of Search ............. 204/158.2, 158.21, 157.3; 422/4, 5, 76.2, 76, 186.3; 8/557; 502/119, 120

[56] References Cited

U.S. PATENT DOCUMENTS 4,167,395  9/1979  Engelhardt et al. ..................... 8/557
4,966,665  10/1990  Ibusuki et al. .................. 204/158.21

OTHER PUBLICATIONS

Satterfield, Heterogeneous Catalysis in Practice, 1980, pp. 18, 19.

Primary Examiner—W. Gary Jones
Assistant Examiner—Dean Tan Nguyen
Attorney, Agent, or Firm—Sherman and Shalloway

[57] ABSTRACT

A harmful substance remover, which is used to remove any of ethylene, mercaptans, amines and aldehydes, is a solid product having a specific surface area of 100 m$^2$/g or more obtained by hydrolyzing a metal alkoxide in the presence or absence of a noble metal. The harmful substance remover is utilized by contacting a harmful substance therewith. Such contacting may take place under irradiation of ultraviolet rays.

10 Claims, No Drawings

METHOD FOR REMOVING A HARMFUL SUBSTANCE SELECTED FROM THE GROUP CONSISTING OF ETHYLENE, MERCAPTANS, AMINES, AND ALDEHYDES

The present invention relates to a remover for harmful substances such as bad-smelling substances, substances of irritating smell, growth-promoting substances for garden plants, and the like, a process for producing the remover, and a method for removing a harmful substance by the use of the remover.

Bad smells and irritating smells generated in industries, smells emitted by wastes generated at homes and restaurants, and bad smells and irritating smells generated in cooking have become a bigger problem in recent years. These smells are composed mainly of hydrogen sulfide, ammonia, mercaptans, amines, aldehydes, etc.

Meanwhile, supply of vegetables, fruits and flowers in fresh states or at times other than their natural harvest times is being increasingly required. In order to keep these garden plants in fresh states, it is desired to develop a method for effectively removing growth-promoting substances (plant growth hormones) such as ethylene and the like.

As the conventional methods for removing these harmful substances, there are known, for example, (1) a method wherein a harmful substance is adsorbed by a porous substance such as active carbon, alumina, silica gel, zeolite or the like, (2) a method wherein an acidic (or basic) harmful substance is neutralized with a basic (or acidic) substance, and (3) a method wherein a harmful substance is chemically oxidized with potassium permanganate, chlorine dioxide or the like.

These conventional methods, however, are not necessarily satisfactory. That is, in the method (1), the adsorbability for basic substances (ammonia, etc.) and ethylene is not sufficient; in the method (2), the harmful substances removed are restricted depending upon the basic (or acidic) substance used; in the method (3), the removal rate is low.

The object of the present invention is to provide a method for harmful substance removal which is free from the above-mentioned drawbacks and which can remove various harmful substances simultaneously and efficiently. The other object of the present invention is to provide a novel harmful substance remover used in the above method and a process for producing the remover.

The present inventors made study in order to achieve the above objects and, as a result, found that a solid product obtained by hydrolyzing a metal alkoxide has excellent removability for harmful substances.

According to the present invention, there are provided a harmful substance remover which is a solid product having a specific surface area of 100 m²/g or more obtained by hydrolyzing a metal alkoxide in the presence or absence of a noble metal; a process for producing the above harmful substance remover, which comprises hydrolyzing a metal alkoxide and drying the resulting solid product at a temperature lower than 300° C.; and a method for removing a harmful substance by the use of the above harmful substance remover.

The metal alkoxide used in the present invention as a starting material for harmful substance remover (hereinafter referred to simply as remover, in some cases) has no particular restriction as to its composition or production method, as long as it is an alcohol ester of a metal. While it is generally known that metal alkoxides can be produced from most of the metals listed in the periodic table ["Kogyo Zairyo (Industrial Materials)", Vol. 29, No. 5, pp. 85–89, 1989, published by the Nikkan Kogyo Shimbun, Ltd.], preferred in the present invention are alkoxides of the elements of groups IIa, IIb, IIIa, IIIb, IVa, IVb, Va, Vb and VIII of the short form of the periodic table, particularly alkoxides of aluminum, silicon, titanium, zinc and zirconium, in view of their chemical stability and availability. The alcohol component of the metal alkoxide is not particularly restricted, either; however alcohols of 1–4 carbon atoms are preferred in view of the hydrolyzability of metal alkoxide and the removability of alcohol generated in hydrolysis.

In the present invention, there may be used an alkoxide of two or more metals; or, there may be used two or more metal alkoxides in combination.

In the present invention, the method for hydrolysis of metal alkoxide is not particularly restricted. It can be effected by adding water to a metal alkoxide or by adding a metal alkoxide to water. In these methods, the metal alkoxide can be used as it is, or as a solution or dispersion in a solvent; however, the use as a solution in a solvent is preferable in order to prevent violent reaction and obtain a hydrolyzate of fine particles and uniform particle size. In the hydrolysis, water may be replaced by a mixture of water and an alcohol, and water or the water-alcohol mixture may be used in combination with a solvent. Further, water or the water-alcohol may be made acidic or basic, in advance, by the use of an acidic or basic substance in order to accelerate the hydrolysis. The solvent used above may be an inorganic compound or an organic compound; however, it is preferably the same alcohol as used in the synthesis of metal alkoxide, in view of the solubility of the metal alkoxide. In view of the removability in the drying step of the metal alkoxide or the handleability, there is preferred a solvent having a boiling point of preferably 200° C. or less, more preferably 150° C. or less. Specific examples of the solvent include alcohols such as methyl alcohol, ethyl alcohol, isopropyl alcohol, butyl alcohol, amyl alcohol and the like; aromatic hydrocarbons such as benzene, toluene, xylene and the like; and hydrocarbons of chain structure such as hexane, heptane and the like.

In the present invention, a harmful substance remover of high capability can be obtained by hydrolyzing a metal alkoxide in the presence of a noble metal.

In the present invention, the noble metal refers to a noble metal per se selected from gold, silver, copper and platinum group elements (ruthenium, rhodium, palladium, osmium, iridium and platinum), as well as to compounds containing these noble metals. Examples of said compounds include oxides, chlorides and complexes, and are not restricted to these.

The noble metal is allowed to be present in the reaction system at the time of hydrolysis of metal alkoxide. It is effected, for example, by (1) dissolving or dispersing, in advance, a noble metal in the solvent, water or water-alcohol mixture used in the hydrolysis, (2) mixing a noble metal with a metal alkoxide in advance and then hydrolyzing the metal alkoxide, or (3) effecting hydrolysis and simultaneously adding noble metal to the reaction system. Preferably, the noble metal is used in a solution in a solvent, to disperse the noble metal uniformly in the hydrolyzate of the metal alkoxide.

In the present invention, the amount of the noble metal used is not particularly restricted but is preferably 10% by weight or less based on the metal alkoxide. When the amount of the noble metal is too large, the noble metal does not uniformly mix with the hydrolyzate of the metal alkoxide, resulting in lower removability for harmful substances.

The hydrolyzate is then separated from the solvent or by-products by means of filtration, decantation, evaporation to dryness, or the like. In order to remove the solvent, the alcohol generated, etc. adhering to the hydrolyzate and thereby obtain improved removability for harmful substances, the separated hydrolyzate is generally dried at a temperature of lower than 300° C., preferably 60°–250° C. Drying may be effected at room temperature, but it takes a longer time. Drying at a temperature of 300° C. or more is not preferable because it brings about reduction in removability for harmful substances. The reason is not clear because the action mechanism of the harmful substance remover of the present invention is not yet clarified; however, the reason is presumed to be that drying at a temperature of 300° C. or more causes rapid reduction in specific surface area of hydrolyzate. The time required for drying is not particularly restricted and the completion timing of drying can be taken as a time when there is substantially no weight decrease. The drying time is generally 1–10 hours. Drying can be effected in air and need not be effected in an inert gas atmosphere. Further, drying can be effected in normal pressure or in reduced pressure.

The heating method for drying is not particularly restricted, but in practical application there is preferred heating by electricity, steam, hot water or electromagnetic wave because it provides a constant temperature uniformly and stably.

In the present invention, the solid product preferably has a specific surface area of 100 m$^2$/g or more as measured by the BET method. The solid product, even when it has a specific surface area of less than 100 m$^2$/g, can remove harmful substances although the removal rate is lower.

In the present invention, the solid product obtained by drying the hydrolyzate of a metal alkoxide at a temperature of less than 300° C. can be used as it is; it can also be used as a mixture with an adsorbent, or by being supported by a catalyst carrier (an inorganic porous material made of ceramic, glass or the like), a porous material made of an organic polymer, a woven cloth, an nonwoven cloth, a fiber, a paper or the like. Or, it is possible that an adsorbent, a porous material or the like be molded into a carrier of a honeycomb form, a sponge form or a more complex form and the solid product be supported on the carrier before or after said molding. Examples of the adsorbent include active carbon, natural zeolite, artificial zeolite, alumina, silica gel, allophane and clay. Examples of the catalyst carrier include silica, silica-alumina, silicon carbide, titania, zirconia, magnesia, cordierite and mullite. Examples of the organic polymer include homopolymers such as polyethylene, polypropylene, poly(vinyl chloride), polyester, polystyrene, poly(tetrafluoroethylene) and the like, and copolymers such as acrylonitrile-butadiene-styrene copolymer (ABS), acrylonitrile-methyl acrylate copolymer, ethylene-terafluoroethylene copolymer (ETFE), ethylene-vinyl acetate copolymer and the like.

When the solid product is used for removal of large amount(s) of harmful substance(s) or for removal of such substances in a short time, it is preferable that the solid product be filled into a reactor to form a fixed or fluidized bed, or be supported by a carrier to form a filter, in order to increase the efficiency of contact between the solid product and the harmful substance(s). In the reactor to be used as a fixed or fluidized bed, at least part of its outer wall is made of an adsorbent or porous material incapable of transmitting the solid product but capable of transmitting harmful substance(s) or a fluid containing the substance(s). When the solid product is used in a filter form, the filter is preferably such that obtained by processing an adsorbent, a porous material or the like into a honeycomb form, a sponge form or the like and allowing the resulting carrier to support the solid product.

The method of the present invention can be effected batchwise or continuously by introducing into a particular reactor harmful substance(s) or a gas containing said substance(s) (said gas in hereinafter referred to as "gas to be treated", in some cases).

The harmful substance remover of the present invention can be repeatedly used by reclamation. The method for reclamation includes a method wherein a used remover is heated at a temperature of lower than 300° C., a method wherein a used remover is irradiated with an electromagnetic wave such as ultraviolet rays, visible light, infrared rays or the like, a method wherein a used remover is contacted with ozone, and a method wherein a used remover is irradiated with an ultrasonic wave. The method is not restricted to any particular one as long as it can restore the removability of the remover.

In the present invention, the efficiency of harmful substance removal can be enhanced by effecting the removal under the irradiation with ultraviolet rays.

The ultraviolet rays used in the present invention are preferably near-ultraviolet rays having a wavelength of 400–200 nm, but may contain vacuum ultraviolet having a wavelength of 200 nm of less. These ultraviolet rays can be generated by single or combination use of an ultrahigh pressure mercury lamp, a xenon lamp and a low pressure mercury lamp. The rays may be generated by using a light source improved so as to produce a light of desired wavelength distribution, by allowing a third component such as gallium, thallium or the like to be present in a discharge tube together with mercury and a rare gas. The ultraviolet rays may contain a light such as a visible light.

In the present invention, the site of the ultraviolet lamp provided is not particularly restricted as long as efficient irradiation of the solid product can be conducted. When the ultraviolet rays are used for irradiation of a fluidized or fixed bed, the lamp may be provided outside the reactor; however, the lamp is preferably provided inside the reactor in order to effect efficient irradiation.

Thus, the present invention, as compared with the prior art, enables simultaneous, rapid and efficient removal of harmful substances such as bad-smelling substances, substances of irritating smell, growth-promoting substances for garden plants, and the like.

Further, the method of the present invention is suitable for removal of high concentration(s) of harmful substance(s), because the solid product is effective even after the saturation with harmful substance(s).

The present invention is hereinafter described in more detail by way of Examples and Comparative Examples. However, the present invention is not restricted to them. In the Examples, parts and % are by weight unless otherwise specified.

EXAMPLE 1

Run Nos. 1-3

1 g of deionized water was slowly added dropwise to 6 g of each metal alkoxide shown in Table 1 which was being stirred, whereby hydrolysis was effected. (Each alkoxide was used as it was when it was a liquid, and after having being dissolved in 60 g of n-hexane when it was a solid.) The resulting precipitate was collected by filtration through a glass filter, subjected to predrying at 60° C. for 8 hours in a vacuum dryer, and dried at 200° C. for 1 hour at normal pressure to obtain a harmful substance remover in a powdery state.

1 g of the remover was placed in an 80-ml Erlenmeyer glass flask capable of transmitting ultraviolet rays. The flask inside was purged with an air containing ethylene of an initial concentration shown in Table 1. The flask was then sealed with a silicone rubber stopper. The change of ethylene concentration in the flask with time was traced by gas chromatography. The results are shown in Table 1.

COMPARATIVE EXAMPLE 1

Run Nos. 4-6

The same test as in Example 1 was conducted except that the temperature of drying at normal pressure was changed to 400° C. The results are shown in Table 1.

COMPARATIVE EXAMPLE 2

Run Nos. 7-9

The same evaluation as in Example 1 was conducted using each 1 g of three deodorants on the market, i.e. honeycomb-shaped active carbon, potassium permanganate and titanium dioxide. The results are shown in Table 1.

TABLE 1

| Run No. | Metal alkoxide or deodorant on the market | Drying temperature | Specific surface area (m$^2$/g) | Initial ethylene concentration (ppm) | Residual ethylene (%) After 1 min | After 10 min | After 30 min | Half life (min) |
|---|---|---|---|---|---|---|---|---|
| Example 1 | | | | | | | | |
| 1 | Titanium tetraisopropylate (2) | 200° C. | 335 | 93 | 44 | 19 | 1 | 1 |
| 2 | Zirconium tetrabutylate (2) | " | 399 | 78 | 56 | 29 | 2 | 1 |
| 3 | Aluminum tri isopropylate (3) | " | 220 | 106 | 47 | 18 | 5 | 1 |
| Comparative Example 1 | | | | | | | | |
| 4 | Titanium tetraisopropylate (1) | 400° C. | 75 | 74 | 100 | 98 | 93 | >90 |
| 5 | Zirconium tetrabutylate (2) | " | 83 | 77 | 100 | 97 | 94 | >90 |
| 6 | Aluminum tri isopropylate (3) | " | 69 | 71 | 99 | 96 | 91 | >90 |
| Comparative Example 2 | | | | | | | | |
| 7 | Honeycomb-shaped active carbon (4) | — | — | 111 | 81 | 42 | 38 | 8 |
| 8 | Potassium permanganate (5) | — | — | 113 | 100 | 99 | 95 | >90 |
| 9 | Titanium dioxide (6) | — | 51 | 70 | 100 | 100 | 90 | >90 |

(1), (3), (5): Products of Wako Pure Chemical Industries, Ltd.
(2): A product of Nippon Soda Co., Ltd.
(4): A product of KYOCERA CORP.
(6): A product of NIPPON AEROSIL CO., LTD.

As is clear from Table 1, the harmful substance removers of the present invention are far superior in ethylene removability to typical deodorants on the market. It is also clear that ethylene removability is lower when specific surface area is smaller than 100 m$^2$/g.

EXAMPLE 2

Run Nos. 10-13

The same test as in Example 1 was conducted except that the deionized water was replaced by an deionized water solution containing 10% of a noble metal shown in Table 2.

The results are shown in Table 2.

As is clear from Table 2, the removers obtained from a product obtained by hydrolyzing a metal alkoxide in the presence of a noble metal compound, have a higher ethylene removability.

TABLE 2

| Run No. | Metal alkoxide or deodorant on the market | Noble metal | Specific surface area (m$^2$/g) | Initial ethylene concentration (ppm) | Residual ethylene (%) After 1 min | After 10 min | After 30 min | Half life (min) |
|---|---|---|---|---|---|---|---|---|
| Example 2 | | | | | | | | |
| 10 | Titanium tetraisopropylate (1) | Silver nitrate | 319 | 112 | 1.4 | 0.2 | 0.0 | <1 |
| 11 | Zirconium tetrabutylate (2) | " | 307 | 90 | 3.1 | 0.7 | 0.0 | <1 |
| 12 | Aluminum tri isopropylate (3) | " | 211 | 104 | 3.8 | 0.9 | 0.0 | <1 |
| 13 | Titanium tetraisopropylate (1) | Palladium nitrate | 356 | 118 | 1.8 | 0.1 | 0.0 | <1 |

(1), (2), (3): The same as in Table 1

EXAMPLE 3

Run Nos. 14-16

The same remover as used in Example 2 Run No. 10, prepared from titanium isopropylate and silver nitrate was measured for removability for each of harmful substances (shown in Table 3) present in air, in the same manner as in Example 1.

The results are shown in Table 3. It is clear from Table 3 that the harmful substance remover of the present invention is effective for removal of various harmful substances.

TABLE 3

| Run No. | Kind of harmful substance | Initial concentration (ppm) | Residual ethylene (%) After 1 min | After 10 min | After 30 min | Half life (min) |
|---|---|---|---|---|---|---|
| Example 3 | | | | | | |
| 14 | Methyl mercaptan | 100 | 2 | 0.5 | 0.0 | <1 |
| 15 | Trimethylamine | 123 | 0.0 | 0.0 | 0.0 | <1 |
| 16 | Formaldehyde | 92 | 11 | 5 | 0.0 | <1 |

EXAMPLE 4

Run Nos. 17-20

9 g each of the titanium alkoxides shown in Table 4 was placed in an enameled vat of 15 cm x 15 cm x 2 cm (depth). Thereinto was immersed a nonwoven cloth with electrostatic charge of 10 cm×10 cm, and the cloth was impregnated with the titanium alkoxides. The impregnated nonwoven cloth was taken out and uniformly sprayed with deionized water by means of hand spraying. The resulting cloth was subjected to predrying at 60° C. for 8 hours in a vacuum dryer and then dried at 150° C. for 1 hour at normal pressure to obtain electrostatic nonwoven cloths each supporting a different harmful substance remover.

Two test pieces of 1 cm×5 cm were prepared from each of the above cloths. (The amount of harmful substance remover supported on these two test pieces was 0.8 g in total.) The two test pieces were placed in an 80-ml Erlenmeyer glass flask capable of transmitting ultraviolet rays. The flask inside was purged with an air containing ethylene of an initial concentration shown in Table 4. The flask was then sealed with a silicone rubber stopper. The flask was irradiated with ultraviolet rays emitted from an ultrahigh pressure mercury lamp (illuminance=10 mW/cm$^2$, main wavelength=365 nm) placed at a distance of 20 cm from the flask. The change of ethylene concentration in the flask after the start of irradiation was traced by gas chromatography. The results are shown in Table 4.

The same test as above was conducted except that no irradiation with ultraviolet rays was effected. The results are also shown in Table 4.

COMPARATIVE EXAMPLE 3

Run Nos. 21-22

The same test as in Example 4 was conducted using 1 g each of two deodorants on the market, i.e. silver-supporting zeolite [Bactekiller (trade name) manufactured by KANEBO, Ltd.] and titanium dioxide. The results are shown in Table 4.

As is clear from Table 4, the present invention method enables rapid removal of ethylene while the removal rate is low in Comparative Example 3 using deodorants on the market.

TABLE 4

| Run No. | Titanic acid ester or deodorant on the market | Drying temperature (°C.) | Specific surface area (m$^2$/g) | Ultraviolet irradiation | Initial ethylene concentration (ppm) | Residual ethylene (%) After 1 min | After 10 min | Half life (min) |
|---|---|---|---|---|---|---|---|---|
| Example 4 | | | | | | | | |
| 17 | Titanium tetraisopropylate | 200 | 316 | Yes | 99 | 6 | 0.22 | <1 |
| 18 | Titanium tetra-n-butylate | 200 | 367 | Yes | 91 | 7 | 0.22 | <1 |
| 19 | Titanium tetraisopropylate | 200 | 316 | No | 98 | 12 | 0.77 | <1 |
| 20 | Titanium tetra-n-butylate | 200 | 367 | No | 95 | 15 | 1.11 | <1 |
| Comparative Example 3 | | | | | | | | |
| 21 | Silver-supporting zeolite | — | — | Yes | 106 | 90 | 88 | >180 |
| 22 | Titanium dioxide | — | 52 | Yes | 103 | 93 | 67 | 15 |

EXAMPLE 5

Run Nos. 23-24

A solution of 14 g of titaniunm tetraisopropylate dissolved in 50 ml of n-hexane, contained in a dropping funnel was slowly added dropwise to a mixture consisting of 50 ml of n-hexane, 10 ml of ethanol and a 10% aqueous silver nitrate solution, which was being stirred. The resulting precipitate was collected by filtration through a glass filter, subjected to predrying at 60° C. for 8 hours in a vacuum dryer, and dried at 200° C. for 1 hour at normal pressure to obtain a solid product. 1 g of the solid product was subjected to the same test as in Example 4.

The same test as above was conducted except that the silver nitrate was replaced by paladdium nitrate.

The result of these tests are shown in Table 5.

TABLE 5

| Run No. | Noble metal | Specific surface area (m$^2$/g) | Ultraviolet irradiation | Initial ethylene concentration (ppm) | Residual ethylene (%) After 1 min | After 10 min | Half life (min) |
|---|---|---|---|---|---|---|---|
| Example 5 | | | | | | | |
| 23 | Silver nitrate | 322 | Yes | 102 | 4 | 0.0 | <1 |
| 24 | Palladium nitrate | 359 | Yes | 99 | 3 | 0.0 | <1 |

EXAMPLE 6

Run Nos. 25-27

The solid product prepared from titanium tetraisopropylate and silver nitrate in the same manner as in Example 5, was measured for removability for harmful substances (shown in Table 6) present in air, in the same manner as in Example 5.

The results are shown in Table 6. Table 6 indicates that the present invention method enables rapid removal of various harmful substances.

TABLE 6

| Run No. | Harmful substance | Initial concentration (ppm) | Residual proportion (%) of harmful substance | | | Half life (min) |
| --- | --- | --- | --- | --- | --- | --- |
| | | | After 1 min | After 10 min | After 30 min | |
| Example 6 | | | | | | |
| 25 | Methyl mercaptan | 97 | 1 | 0.4 | 0.0 | <1 |
| 26 | Trimethylamine | 102 | 0.0 | 0.0 | 0.0 | <1 |
| 27 | Formaldehyde | 106 | 3 | 1.1 | 0.0 | <1 |

EXAMPLE 7

Run Nos. 28–29

7 g of zinc chloride was dissolved in isopropanol dehydrated with a molecular sieve. Through the resulting solution being ice-cooled was bubbled ammonia gas supplied through a glass tube, for 1 hour. Ammonia gas was removed from the resulting solution by using an evaporator. The ammonia-removed solution was subjected to centrifugation. To the resulting supernatant solution was dropwise added 10 ml of deionized water. The resulting precipitate was collected by filtration, subjected to predrying at 60° C. for 8 hours in a vacuum dryer, and dried at 200° C. for 1 hour at normal pressure to obtain a solid product. The solid product was subjected to the same test as in Example 5. The results are shown in Table 7.

TABLE 7

| Run No. | Specific surface area (m²/g) | Ultra-violet irradiation | Initial ethylene concentration(ppm) | Residual ethylene (%) | | Half life (min) |
| --- | --- | --- | --- | --- | --- | --- |
| | | | | After 1 min | After 10 min | |
| Example 7 | | | | | | |
| 28 | 345 | Yes | 104 | 5 | 0.15 | <1 |
| 29 | 345 | No | 102 | 51 | 21 | 1 |

EXAMPLE 8

30 kiwi fruits on the market were placed in a 12-liter desiccator provided in a constant low-temperature test chamber. Using a tube, there were connected, in the following order, (1) the above desiccator, (2) a 300-ml flask for photochemical reaction which contains 5.0 g of a solid product prepared from titanium tetraisopropylate and silver nitrate in the same manner as in Example 2 and to which a low-pressure mercury lamp (illuminance=3 mW/cm², main wavelength= 254 nm) was attached in order to enable irradiation of the solid product, and (3) a diaphragm type air pump. Incidentally, the flask (2) and the air pump (3) were installed outside the constant low-temperature test chamber. The desiccator inside was kept at 10° C. and a humidity of 90% or more, after which the air in the total system was circulated by the diaphragm type air pump [Test A (present invention)]. The same test was conducted except that no ultraviolet irradiation was made [Test B (present invention)]. Also, the same test was conducted except that no remover (no solid product) was used [Test C (Comparison)].

Neither ethylene nor acetaldehyde was detected in any of Tests A, B and C, at the start of air circulation. After four weeks, the concentrations of ethylene and acetaldehyde in the desiccator were measured by gas chromatography; neither ethylene nor acetaldehyde was detected in Tests A and B, while 7 ppm of ethylene and 2 ppm of acetaldehyde were detected in Test C. Measurement was made again after 60 days; any of the two substances was detected in Tests A and B, while 15 ppm of ethylene and 4 ppm of acetaldehyde were detected in Test C.

The kiwi fruits were also measured for saccharose concentration, using a refractometer manufactured by Atago. The saccharose concentration indicated in refractometer index after four weeks was 16 in Tests A and B and was not much different from the concentration (17) before the test, while the concentration after four weeks was low (12) in Test C. Moreover, the kiwi fruits of Test C after four weeks had soft skins generally and shrivelled, as compared with those of Tests A and B. Six of the Test C kiwi fruits showed oozing-out of fruit juice.

It is appreciated from the above results that the present invention method is effective to keep garden plants fresh.

EXAMPLE 9

10 g of a harmful substance remover prepared from titanium tetraisopropylate and silver nitrate in the same manner as in Example 2 was placed in a cyclindrical glass reactor capable of transmitting ultraviolet rays, of 35 mm in inside diameter and 300 mm in length, having an inlet and an outlet (both of 5 mm in inside diameter and 40 mm in length) at the both ends via respective glass filter portions.

The reactor was kept vertically. Through the lower leg portion of the reactor was introduced into the reactor an air containing about 100 ppm of ethylene, methyl mercaptan, trimethylamine or formaldehyde, at a rate of 0.5–10/min, whereby the part or whole portion of the remover of the present invention was kept floating; the air was allowed to leave out through the upper leg of the reactor. The resulting gas was measured for concentration harmful substance by gas chromatography. The concentration was below the detection limit in all cases.

It is clear from the above test that the harmful substance remover of the present invention when used as a fluidized bed shows a striking effect for harmful substance removal.

EXAMPLE 10

Run Nos. 30

1 g of a solid product prepared from titanium tetraisopropylate and silver nitrate in the same manner as in Example 2, was placed in an 80-ml Erlenmeyer glass flask capable of transmitting ultraviolet rays. The flask inside was purged with an air containing 10,000 ppm of ethylene. The flask was sealed with a silicone rubber stopper and allowed to stand for 8 hours. The stopper was removed, and the flask inside was exposed to air for 1 hour to allow the ethylene remaining in the flask to leave. Then, the solid product in the flask was irradiated with ultraviolet rays for 2 hours using an ultrahigh pressure mercury lamp (illuminance=10 mW/cm$^2$, main wavelength=365 nm) provided at a distance of 20 cm from the flask. Then, the flask inside was purged with an air containing about 100 ppm of ethylene. The flask was sealed with a silicone rubber stopper and subjected to the same test as in Example 1. The results are shown in Table 8.

COMPARATIVE EXAMPLE 4

Run Nos. 31

The same test as in Example 10 was conducted except that the ultraviolet irradiation after leaving of ethylene was not conducted. The results are shown in Table 8.

TABLE 8

| Run No. | Initial ethylene concentration(ppm) | Residual ethylene (%) | | | Half life (min) |
|---|---|---|---|---|---|
| | | After 1 min | After 10 min | After 30 min | |
| Example 10 30 | 101 | 91 | 70 | 38 | 15 |
| Comparative Example 4 31 | 99 | 100 | 97 | 91 | >180 |

As is clear from Table 8, the harmful substance remover of the present invention can be repeatedly used by reclamation.

What is claimed is:

1. A method for removing a harmful substance selected from the group consisting of ethylene, mercaptans, amines and aldehydes, which comprises contacting a harmful substance selected from the group consisting of ethylene, mercaptans, amines and aldehydes with a harmful substance remover, for the removal of ethylene, mercaptans, amines and aldehydes, which is a solid product having a specific surface area of 100 m$^2$/g or more obtained by hydrolyzing a metal alkoxide in the presence or absence of a noble metal under the irradiation of ultraviolet rays.

2. The method for removing a harmful substance according to claim 1, wherein the metal alkoxide is an alkoxide of titanium or zinc.

3. A method for removing a harmful substance selected from the group consisting of ethylene, mercaptans, amines and aldehydes, which comprises contacting said harmful substance with a harmful substance remover, for the removal of ethylene, mercaptans, amines and aldehydes, which is a solid product having a specific surface area of 100 m$^2$/g or more obtained by hydrolyzing a metal alkoxide in the presence or absence or a noble metal.

4. The method for removing a harmful substance according to claim 3, wherein the harmful substance remover is supported on a carrier.

5. A harmful substance remover, for the removal of ethylene, mercaptans, amines and aldehydes, which is a solid product having a specific surface area of 10 m$^2$/g or more obtained by hydrolyzing a metal alkoxide int he presence or absence of a noble metal.

6. The harmful substance remover according to claim 1, which is obtained by drying the solid product at a temperature of 60°-250° C.

7. The harmful substance remover according to claim 1, wherein the metal alkoxide is an alkoxide of an element of the group IIa, IIb, IIIa, IIIb, IVa, IVb, Va, Vb or VIII of the short form of the periodic table.

8. The harmful substance remover according to claim 1, wherein the metal alkoxide is an alkoxide of titanium, aluminum, silicone, zirconium, or zinc.

9. The harmful substance remover according to claim 1, wherein the metal alkoxide is an alkoxide of an alcohol of 1–4 carbon atoms.

10. The harmful substance remover according to claim 1, wherein the metal alkoxide is hydrolyzed in the presence of a noble metal of an amount of 10% by weight or less based on the metal alkoxide.

* * * * *